United States Patent Office 3,354,077
Patented Nov. 21, 1967

3,354,077
STABILIZED ZEOLITES AND USE THEREOF
FOR HYDROCARBON CONVERSIONS
Rowland C. Hansford, Yorba Linda, Calif., assignor to Union Oil Company of California, Los Angeles, Calif., a corporation of California
No Drawing. Filed Mar. 30, 1966, Ser. No. 538,606
10 Claims. (Cl. 208—111)

This application is a continuation-in-part of Ser. No. 292,494, filed July 2, 1963, now abandoned.

This invention relates to new methods for treating certain silica-rich, molecular sieve hydrogen zeolites of the Y crystal type, so as to produce novel catalyst compositions having improved hydrothermal stability, i.e., resistance to losses in surface area and crystallinity upon contact with water. The invention is particularly concerned with Y-sieve hydrogen zeolite compositions which, by virtue of their low sodium content and improved hydrothermal stability, are particularly useful as catalysts in hydrocracking and isomerization processes wherein the catalyst may come in contact with water vapor.

Briefly stated, the novel stabilizing treatment of the invention comprises a calcining step carried out preferably at above about 800° F. during which the partial pressure of water vapor is maintained at a level above about 0.4 p.s.i.a. Following this hydrothermal stabilization treatment, the resulting zeolite can be contacted with water or water vapor at substantially any temperature below about 1,200° F., without undergoing appreciable losses in surface area or crystallinity. To render the stabilizing treatment effective however, it is necessary to avoid previous contact of the hydrogen zeolite with water at temperatures between about 300° and 500° F. This means that the heat-up to effective stabilizing temperatures must be carried out under dry conditions (e.g., below about 0.2 p.s.i.a. partial pressure of water vapor) in all cases where the zeolite is initially in an unstable hydrogen form.

It has recently been discovered that certain zeolitic molecular sieves of the Y crystal type, in their ammonium form, can be heated at relatively high temperatures to decompose the ammonium ion, and that the resulting hydrogen zeolites (which are sometimes referred to as being "decationized") still exhibit a high degree of crystallinity and surface area, and have a relatively high acidity. These characteristics are in sharp contrast to the results obtained when other molecular sieve zeolites are similarly treated to form hydrogen zeolites; in the case of these other zeolites, e.g., zeolites of the X crystal type, the attempted conversion of the ammonium zeolite to a hydrogen zeolite results in a complete collapse of the crystal structure with resultant marked decrease in surface area.

As a result of their high acidity and surface area, the hydrogen zeolites of the Y crystal type have been found to be very useful as bases for catalysts to be employed in reactions such as hydrocracking or isomerization, which require a combination of a highly acidic base with a hydrogenating component such as palladium, platinum or nickel.

One of the difficulties which has been encountered in using catalysts based on hydrogen Y zeolites resides in their relatively poor hydrothermal stability, i.e., their ability to retain crystallinity and surface area after contact with water vapor at temperatures of 300°–500° F. Any substantial loss in surface area results in a corresponding decrease in catalytic activity. In the case of catalysts prepared from conventional hydrogen Y zeolites, wherein the sodium content ($Na_2O$) is less than about 3% by weight, it is often observed that there is an almost complete collapse of crystal structure upon hydration of the catalyst, followed by heating to drive off the water. The collapse in crystal structure is often accompanied by a decrease in surface area from figures in the neighborhood of 800–1,100 square meters per gram down to 20–100 square meters per gram. Losses in surface area of this magnitude are substantially fatal to continued catalytic activity.

Hydrothermal stability of catalysts is important in substantially any hydrocarbon conversion process, and particularly in processes where the catalyst is periodically regenerated by combustion of deactivating deposits. In conversion processes such as hydrocracking or isomerization, the catalyst may be inadvertently contacted with water, as by water-contaminated feedstocks or hydrogen supply, etc. Also, in the shipping of the catalyst, and loading of catalytic reactors, it is substantially impossible to avoid contacting the catalyst with moist air, and where the catalyst rapidly adsorbs water as in the present case, it may be in a hydrated condition by the time it is loaded in the reactor. This water is subsequently desorbed during the heat-up or reaction period, and it is during this period that the greatest damage may occur. During oxidative regeneration, the catalyst may also suffer hydrothermal damage due to water vapor in the input regeneration gases, or water generated by combustion of hydrocarbonaceous deposits. It is obvious therefore, that in nearly any commercial use of solid catalysts, it is important that they exhibit a high degree of hydrothermal stability.

It is known that a considerably higher degree of hydrothermal stability can be obtained in the case of hydrogen Y zeolites by only partially exchanging the sodium with ammonium ion, and then decomposing the sodium-ammonium zeolite to form a sodium-hydrogen zeolite containing, e.g., about 4–6% by weight of $Na_2O$. (As initially prepared, the sodium Y zeolite contains about 13–15% by weight of $Na_2O$.) However, although improved hydrothermal stability can be obtained by this means, it is found that when more than about 3% by weight of $Na_2O$ remains in the zeolite, the catalytic activity suffers greatly, and some loss in activity occurs when the $Na_2O$ content is greater than about 1%. Apparently, sodium in amounts greater than about 1–1.5% tends to neutralize the active acidic centers on the catalyst. It would therefore be highly desirable to provide methods for maintaining hydrothermal stability in those hydrogen zeolite compositions containing less than about 3%, and preferably less than 1.5%, by weight of $Na_2O$.

It is also known that the deleterious effects of sodium in the catalyst bases can be overcome to some extent by partially exchanging the sodium zeolites with certain less basic metals such as magnesium, calcium, rare earth metals, etc. (Only partial exchange can here be achieved, due to the difficulty of obtaining complete exchange of monovalent sodium with a polyvalent metal.) The resulting polyvalent metal zeolites are considerably more stable than the hydrogen zeolites and more active than the sodium forms. However, they are in general not as active as the pure hydrogen zeolites. Moreover, due to the difficulty of achieving a high degree of exchange of polyvalent metals for zeolitic sodium, they are more expensive to prepare than the hydrogen forms. It would be highly desirable to provide a zeolite catalyst base having the stability of the polyvalent metal zeolites, and the high activity and low cost of the hydrogen zeolites. To a substantial extent, these objectives are achieved herein.

The hydrothermal stabilization treatment of this invention may be employed to stabilize either the pure hydrogen zeolites, or the mixed metal-hydrogen forms wherein at least 40% and preferably at least about 65% of the ion-exchange capacity is satisfied by hydrogen ions, and wherein not more than 60%, and preferably not more than about 35% is satisfied by metal ions. These hydrogen zeolites are in general characterized by a degree of hydrothermal instability such that, when they are rehydrated (following the initial calcination to convert the ammonium form to the hydrogen form) in moist air to a water content of about 20–30% by weight, and then recalcined in air by heating from room temperature to 900° F. over a 4-hour period, there is at least about a 10%, and usually at least a 20%, loss in surface area and crystallinity.

The stabilized zeolites or catalysts prepared herein are particularly useful in any adsorption or hydrocarbon conversion process where water may be present either continuously or intermittently, and/or wherein the catalyst is periodically regenerated by oxidative combustion, or otherwise contacted with water or water vapor.

In their sodium form, the general formula for the Y molecular sieve zeolites of this invention is expressed as follows:

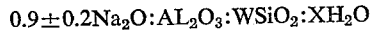
$$0.9 \pm 0.2 Na_2O : Al_2O_3 : W SiO_2 : X H_2O$$

where $X=0$ to about 9, and $W=3$ to about 6. Sodium zeolites of this nature, and methods for their preparation are described in U.S. Patent No. 3,130,007. The Y sieve zeolites having a $SiO_2/Al_2O_3$ mole-ratio of about 3.0 to 3.9 can be prepared by methods which in general involve digesting aqueous solutions of sodium silicate and sodium aluminate at elevated temperatures, following an initial low-temperature aging treatment. A more desirable form of the Y zeolite, having a $SiO_2/Al_2O_3$ mole-ratio of about 4 to 6, can be prepared by methods which involve essentially an initial, low-temperature aging of a mixture of silica hydrosol, sodium hydroxide and sodium aluminate, followed by a high-temperature digestion to effect crystallization of the sodium zeolite. Sodium zeolites prepared by either of these methods can be converted to crystalline hydrogen zeolites by ammonium ion-exchange followed by heating, although the high-silica type of zeolite is generally more stable in its hydrogen form than the hydrogen zeolites prepared from the low-silica zeolites. In either case however, the resulting hydrogen zeolites are deficient in hydrothermal stability, even though the initial preparations may exhibit a high degree of crystallinity and surface area.

The hydrothermal damage which affects the hydrogen zeolites concerned herein is a little understood phenomenon which appears to take place most rapidly when the zeolites are contacted with water or water vapor at temperatures between about 300° and 500° F. At temperatures below 300° F., there is either no damage, or it is very slow in proceeding to a measurable extent. At temperatures between about 500° and 700° F., hydrothermal damage may also occur, but is not often observed because in heating the zeolites up to 500° F., most of the damage will already have occurred at below that temperature. At temperatures between about 700° and 850° F., hydrothermal damage may occur to a limited extent, but apparently is counterbalanced and eventually stopped by preventive stabilization changes which also proceed at these higher temperatures. Thus, the surprising aspect of the present invention is that, while water vapor at intermediate temperatures brings about very undesirable changes in the zeolite structure, water vapor at higher temperatures actually appears to counteract and prevent the type of damage which occurs at lower temperatures.

In view of the rapid destruction of crystallinity and surface area which occurs between 300°–700° F. in the presence of water vapor, extraordinary precautions must be exercised in bringing the zeolite up to the effective stabilization temperatures. If the zeolite is already hydrated and in its hydrogen form (as distinguished from the ammonium zeolite precursor), the heat-up must be carried out slowly in a stream of dry gas, or under vacuum in order to avoid generating any partial pressure of water vapor above about 0.2 p.s.i.a. in the 300°–700° F. temperature range. These precautions can be avoided however by starting with the corresponding ammonium zeolite; the ammonium zeolites appear to be relatively stable to water vapor in the 300°–700° F. temperature range. Hence, the ammonium zeolites can be heated up to stabilizing temperatures under either wet or dry conditions, and are thereafter simultaneously stabilized and converted to the corresponding hydrogen form at temperatures above 700° F., the rate of conversion to the hydrogen form being appreciable only at temperatures above about 700° F.

Having reached effective stabilizing temperatures, the principal operative factors for stabilization are the interrelated variables of time, temperature and partial pressure of water vapor. The stabilizing effect of water vapor, at the operative partial pressures above about 0.4 p.s.i.a., begins to appear at temperatures above about 700° F., and proceeds at a practical rate at temperatures above about 800° F. (at e.g., 2 p.s.i.a. partial pressure of water vapor). Some significant degree of stabilization can normally be obtained at temperatures above 800° F. within one to two hours, but for maximum effect, the calcination should be continued for at least about five hours and preferably at least ten hours. Temperatures above about 1,200° F. should be avoided in order to prevent thermal decomposition of the zeolite. For the maximum effect in simple stabilization of the zeolite structure, there would appear to be no upper limit on the partial pressure of water vapor during calcining. However, in order to minimize concomitant loss in surface area, it is preferred to maintain the partial pressure below about 10 p.s.i.a. When calcining in a total steam atmosphere (14.7 p.s.i.a. water vapor), a 35% loss in surface area has been observed, but the resulting product was extremely stable toward further damage by rehydration and recalcining.

From the foregoing, it may be stated that in general the preferred wet-calcining conditions comprise temperatures of about 800–1,200° F., water partial pressures of about 1 to 10 p.s.i.a., at treatment times of about 2 to 20 hours.

Zeolites or catalysts stabilized as described above may be subsequently rehydrated and reheated through the critical 300–500° F. range with very little further loss in surface area or crystallinity. Moreover, upon each rehydration and recalcining, the stability is further increased so that even smaller losses in surface area occur upon repeated rehydration and recalcining.

A further beneficial effect resulting from the wet-calcination is observed in connection with the stabilized and pelleted zeolite or catalyst compositions. Before the wet-calcination stabilization, such pellets have been observed to undergo almost complete physical disintegration upon contact with liquid water. Thus, in a catalytic reactor or adsorption chamber packed with pelleted zeolite or catalyst, a substantial danger exists of producing catalyst fines by inadvertent contact with liquid water from process sources, with resultant plugging of lines, valves, and increased pressure drops in the contacting zone. The stabilized zeolite pellets of this invention however have been observed to retain their physical structure substantially unchanged upon contact with liquid water, thus avoiding the foregoing undesirable contingencies. The calcining treatment appears to effect, in addition to the preserving of crystal structure, a physical "sintering" of pellets made by compressing the zeolite powders.

The stabilized hydrogen zeolites prepared as described above are useful as adsorbents, and they also possess the required acid-catalyst function for cracking and isomerization activity. For purposes of hydrocracking or hydroisomerization, it is necessary to incorporate a minor proportion of a suitable metal hydrogenating component, e.g., a Group VIII metal. The preferred hydrogenating metals comprise the Group VIII noble metals in amounts of about 0.2 to 3% by weight, and particularly palladium, platinum or rhodium. Such hydrogenating metals may be added to the pre-stabilized zeolite (as by ion-exchange or impregnation), or they may be added thereto prior to the stabilizing treatment. To incorporate such metals by ion-exchange, the ammonium zeolite is digested with an aqueous solution of a suitable compound of a desired metal wherein the metal is present in a cationic form. This procedure is described more specifically in U.S. Patent No. 3,236,761. The resulting metal ammonium zeolite is then subjected to heating, either in a wet or dry atmosphere in order to convert the ammonium form to the hydrogen form, and is thereafter subjected, either immediately or ultimately to the wet-calcining treatment to effect stabilization.

It has been found that certain hydrogenating metals, notably the Group VIII noble metals, tend to undergo agglomeration from their initial homogeneous distribution on the zeolite bases of this invention if the metal-containing zeolites are subjected to the conditions of temperature and water vapor partial pressure required in the stabilization treatment. To avoid this problem it is preferred in these cases to subject the zeolite base to the stabilization treatment before adding the hydrogenating metal component. The stabilized zeolite base can (after reammoniation if desired) be impregnated or ion-exchanged with a solution of the hydrogenating metal, then dried at temperatures below about 700° F. to avoid agglomeration of the metal, and recalcined at 800–1,200° F. under dry conditions.

Finished catalysts prepared as above described are useful for the hydrocracking of mineral oil fractions boiling between about 300–1,200° F., to produce desired lower boiling hydrocarbons, e.g., gasoline, jet fuels, etc. Suitable hydrocracking conditions for a catalyst composition containing about 0.2 to 2% by weight of palladium or platinum, fall within the following ranges:

|  | Operative | Preferred |
|---|---|---|
| Temperature, °F | 400–850 | 500–750 |
| Pressure, p.s.i.g | 300–5,000 | 750–2,000 |
| LHSV | 0.1–10 | 0.5–5 |
| H₂/oil ratio, s.c.f./B | 1,000–20,000 | 2,000–12,000 | washed. Analysis showed a silica/alumina mole-ratio of 4.8.

The foregoing is a typical preparation among several batches of sodium Y zeolites which were utilized for conversion to corresponding ammonium and hydrogen zeolites in the hydrolytic stability tests described below.

B. *Conversion to ammonium zeolites*

Several batches of the foregoing sodium zeolites were ion exchanged in varying degree with hot 27% aqueous ammonium chloride solutions to reduce the $Na_2O$ content from the original 14% to levels of 0.6% (Zeolite $B_1$), 1.4% (Zeolite $B_2$), and 2.5% (Zeolite $B_3$) by weight.

C. *Conversion of ammonium zeolites to hydrogen zeolites without stabilization*

Samples of ammonium zeolites $B_1$, $B_2$ and $B_3$ were heated to 900° F. over a four-hour period, and then calcined in bone-dry air for 12 hours at 900° F. (This procedure removes nearly all water from the zeolites before substantial conversion to the hydrothermally unstable hydrogen form takes place.)

D. *Conversion of ammonium zeolites to hydrogen zeolites followed by stabilization*

Samples of ammonium zeolites $B_1$, $B_2$ and $B_3$ were heated to 900° F. over a four-hour period, and then calcined for 12 hours at 900° F. in atmospheres containing varying amounts of water vapor, to effect varying degrees of stabilization.

E. *Determination of hydrothermal stability of hydrogen zeolites*

Each of the hydrogen zeolites prepared in parts C and D were fully rehydrated at room temperature in moist air (to about 25 weight-percent water), and then heated from room temperature up to 900° F. in dry air, and calcined at that temperature for 12 hours. Surface areas determined before rehydration, and after the rehydration and recalcining were as follows:

TABLE 1

| H₂O Partial Pressure During Initial 12-Hr. Calcination, p.s.i.a. | NH₄-Zeolite B₁ (0.5% Na₂O) Surface Areas, sq. m./g. | | | NH₄-Zeolite B₂ (1.4% Na₂O) Surface Areas, sq. m./g. | | | NH₄-Zeolite B₃ (2.5% Na₂O) Surface Areas, sq. m./g. | | |
|---|---|---|---|---|---|---|---|---|---|
| | After Initial Calcination | After Rehydration and Recalcination | Percent Loss a | After Initial Calcination | After Rehydration and Recalcination | Percent Loss a | After Initial Calcination | After Rehydration and Recalcination | Percent Loss a |
| 0.0 | 973 | 87 | 91 | 973 | 219 | 77 | 965 | 374 | 61 |
| 0.2 | 993 | 126 | 87 | 944 | 302 | 70 | 961 | 485 | 51 |
| 1.1 | 934 | 872 | 20 | 934 | 872 | 10 | 934 | 896 | 7 |
| 1.3 | 930 | 876 | 10 | 944 | 869 | 11 | 922 | 892 | 7 |
| 2.0 | 944 | 869 | 11 | 936 | 892 | 8 | 926 | 909 | 6 |
| 4.1 | 880 | 813 | 17 | 880 | 833 | 14 | 880 | 837 | 13 |
| 7.3 | 796 | 758 | 22 | 806 | 775 | 20 | 814 | 784 | 19 |
| 14.7 | | | | 623 | 620 | 35 | | | | a Expressed as percent loss from underlined figures.

The following examples are cited to illustrate the invention, but are not to be construed as limiting in scope:

EXAMPLE I

A. *Preparation of sodium zeolites*

A solution was prepared by dissolving 970 grams of c.p. NaOH pellets in 4760 ml. of distilled water. Then 375 grams of Nalco No. 680 sodium aluminate (46.0% $Al_2O_3$; 31.0% $Na_2O$) was dissolved in the caustic solution. After cooling to room temperature, the solution was mixed with 6800 grams of Ludox colloidal silica (30% $SiO_2$, 0.3% $Na_2O$) with rapid stirring. After standing at ambient temperature for 28 hours, the thin gel was heated rapidly to 96° C. and held at this temperature for 48 hours. The resulting fine crystals were filtered and From the foregoing, it is readily apparent that hydrothermal stabilization of the zeolites is highly effective at partial pressures of water vapor above about 1 p.s.i.a., and that hydrothermal stability is directly proportional to the sodium content of the zeolites. It is also apparent that, although the stabilization treatment itself may cause considerable loss in surface area at 14.7 p.s.i.a. of water vapor (623 vs. 973 sq. meters/gm.), the resulting product is exceptionally resistant to any further hydrothermal damage upon rehydration and recalcination (620 vs. 623 sq. meters/gm.).

EXAMPLE II

To demonstrate the effect of temperature during calcination, samples of an ammonium zeolite containing 1.1% $Na_2O$, and prepared as described in parts A and B of Example I, were calcined for 12–14 hours at various temperatures in air containing 2 p.s.i.a. of water vapor (13–14 vol-percent steam). The resulting samples were then rehydrated and recalcined as in part E of Example I. Surface areas determined after the initial calcination, and after the rehydration and recalcination were as follows:

TABLE 2

| Stabilization Temp., °F. | Surface Areas, sq. m./g. | | |
|---|---|---|---|
| | After Initial Calcination | After Rehydration and Recalcination | Percent Loss |
| 500 | 942 | 286 | 70 |
| 600 | 950 | 440 | 54 |
| 700 | 942 | 445 | 53 |
| 800 | 928 | 791 | 15 |
| 850 | 940 | 887 | 6 |
| 900 | 940 | 888 | 6 |
| 1,000 | 899 | 854 | 5 |

It is apparent that some stabilization can occur in the 500–700° F. range, but that best results are obtained at temperatures above about 800° F.

EXAMPLE III

This example demonstrates the beneficial effect of stabilization on a finished catalyst, and also shows that stabilization of previously prepared, unstable hydrogen zeolite forms can be effected (i.e., that stabilization does not require starting with an ammonium zeolie).

A hydrocracking catalyst in the form of ⅛-inch pellets, and comprising 0.5% by weight of palladium combined by ion exchange with a hydrogen Y molecular sieve (4.7 $SiO_2/Al_2O_3$ mole-ratio; 1.5% $Na_2O$), was found to have a surface area of 751 sq. meters per gram. Upon rehydrating this catalyst to 27% water content and heating from room temperature up to 900° F., the surface area was found to be only 214 square meters, a loss of about 71%.

Another sample of this catalyst was heated slowly to 900° F., in a stream of bone-dry air and held at that temperature for 12 hours, after which the calcination was continued at 900° F. for 7 hours in wet air (2 p.s.i.a. $H_2O$ partial pressure). Upon rehydration and recalcining, the surface area was 605 square meters, a total loss of only about 19%, compared to 71% for the unstabilized catalyst.

The stabilized catalyst of this example can be employed advantageously for hydrocracking a gas oil boiling between about 400° and 850° F., and essentially free of sulfur and nitrogen compounds, under the following hydrocracking conditions (for 50% conversion per pass to 400° F. end-point gasoline):

Conversion at this level can be continued for at least about 6 months by gradually raising the hydrocracking temperature to compensate for declining catalyst activity, even though a wet recycle gas, saturated with water vapor at 100° F., is employed throughout. Without prior stabilization of the catalyst, such a wet recycle gas would cause permanent deactivation of the catalyst within a few days or weeks, such that temperatures in excess of about 800° F. would be required to maintain conversion.

The conversion temperature of 525° F. noted above reflects some slight loss in catalyst activity due to agglomeration of palladium during the stabilization treatment. A more active catalyst, giving the same conversion at 10–20° F. lower temperatures, is obtained by first stabilizing the zeolite base, then adding the palladium and drying at 500–700° F.

It is not intended that the invention should be limited to the details described above since many variations may be made by those skilled in the art without departing from the scope or spirit of the following claims.

I claim:
1. A method for stabilizing the crystal structure of a hydrogen zeolite of the Y crystal type against hydrothermal degradation without substantial reduction in surface area thereof, said hydrogen zeolite being initially unstable and subject to loss of at least about 10% of its surface area and crystallinity when heated in its hydrated state at temperatures between 300° and 500° F. and containing less than about 3% by weight of $Na_2O$, at least about 40% of the ion-exchange capacity thereof being satisfied by hydrogen ions, which comprises subjecting said hydrogen zeolite to a hydrothermal stabilization treatment by heating the same at temperatures between about 700° and 1,200° F. in contact with a vapor phase comprising at least about 0.4, but not more than about 10, p.s.i.a. partial pressure of water vapor, there having been substantially no previous contacting of said hydrogen zeolite with water vapor of greater than about 2 p.s.i. partial pressure within the temperature range of about 300–500° F.

2. A method as defined in claim 1 wherein the partial pressure of water vapor in said hydrothermal stabilization treatment is between about 1 and 10 p.s.i.a., and wherein the temperature is between about 800° and 1,200° F.

3. A method as defined in claim 1 wherein said hydrogen zeolite has a $SiO_2/Al_2O_3$ mole-ratio between about 4/1 and 6/1, and contains less than about 2% by weight of $Na_2O$.

4. A method as defined in claim 1 wherein said zeolite is compressed in the form of macropellets prior to said hydrothermal stabilization treatment.

5. A method as defined in claim 1 wherein at least about 65% of the ion-exchange capacity of said hydrogen zeolite is satisfied by hydrogen ions.

6. A method as defined in claim 1 wherein the minimum temperature of 700° F. specified for said hydrothermal stabilization treatment is reached by heating said hydrogen zeolite up from a lower temperature in the 300°–500° F. range in a substantially dry atmosphere comprising less than about 2 p.s.i. partial pressure of water vapor.

7. A method as defined in claim 1 wherein the minimum temperature of 700° F. specified for said hydrothermal stabilization treatment is reached by heating the ammonium precursor form of said hydrogen zeolite up from a lower temperature in the 300°–500° F. range, and converting the ammonium form to the said hydrogen form concurrently with said hydrothermal stabilization treatment.

8. A catalyst composition comprising a minor proportion of a Group VIII metal hydrogenation component homogeneously combined with a major proportion of a stabilized hydrogen zeolite of the Y crystal type, said hydrogen zeolite being one which was initially unstable and subject to loss of at least about 10% of its surface area and crystallinity when heated in its hydrated state at temperatures between 300° and 500° F., and containing less than about 3% by weight of $Na_2O$, at least about 40% of the ion-exchange capacity thereof being satisfied by hydrogen ions, said unstable hydrogen zeolite having been thereafter stabilized against hydrothermal degradation without substantial reduction in surface area, by heating the same at temperatures between about 700° and 1,200° F. in contact with a vapor phase comprising at least about 0.4, but not more than about 10, p.s.i.a. partial pressure of water vapor, there having been substantially no previous contacting of said hydrogen zeolite with water vapor of greater than about 2 p.s.i. partial pressure within the temperature range of about 300°–500° F.

9. A catalyst as defined in claim 8 wherein said unstable hydrogen zeolite was first subjected to said hydrothermal stabilization treatment, and thereafter combined with said Group VIII metal hydrogenation and dried at temperatures below about 700° F. to avoid agglomeration of said Group VIII metal which would take place under said hydrothermal stabilization conditions.

10. A hydrocracking process for the conversion of a gas oil feedstock to hydrocarbons boiling in the gasoline range, which comprises contacting said feedstock plus added hydrogen with a hydrocracking catalyst at a temperature between about 400° and 850° F. and at elevated pressures, and recovering gasoline-boiling-range hydrocarbons, said added hydrogen comprising a recycle gas from said hydrocracking containing water vapor in a proportion at least equivalent to its saturation partial pressure therein at 100° F., said catalyst being a hydrothermally stabilized catalyst as defined in claim 8.

References Cited

UNITED STATES PATENTS

| | | | |
|---|---|---|---|
| 3,140,251 | 7/1964 | Plank et al. | 208—120 |
| 3,236,762 | 2/1966 | Rabo et al. | 208—111 |
| 3,257,310 | 6/1966 | Plank et al. | 208—120 |

DELBERT E. GANTZ, *Primary Examiner.*

ABRAHAM RIMENS, *Examiner.*